Figure 1:
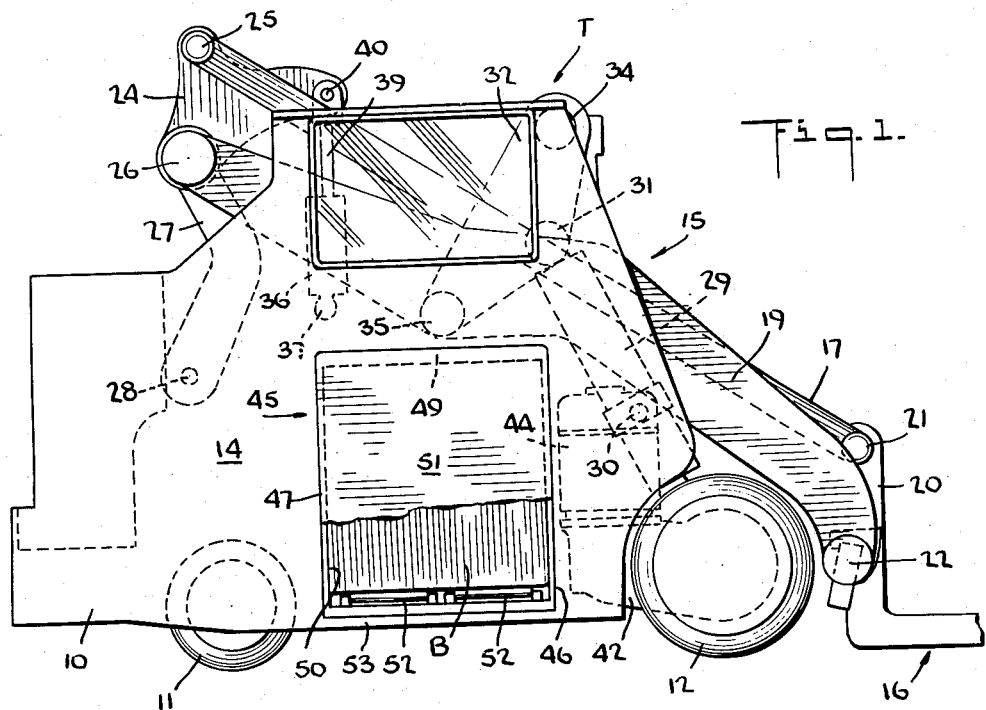

Sept. 20, 1960  B. I. ULINSKI  2,953,264
INDUSTRIAL TRUCK
Filed Dec. 3, 1957

INVENTOR.
BRONISLAUS I. ULINSKI
BY
ATTORNEY

United States Patent Office 2,953,264
Patented Sept. 20, 1960

2,953,264

INDUSTRIAL TRUCK

Bronislaus I. Ulinski, Flossmoor, Ill., assignor to The Yale and Towne Manufacturing Company, Stamford, Conn., a corporation of Connecticut Filed Dec. 3, 1957, Ser. No. 700,369

2 Claims. (Cl. 214—130)

This invention relates to industrial trucks, and, more particularly, to improvements in trucks employing leverage systems for elevating and lowering a load platform.

Industrial trucks of the foregoing class were originally designed to provide advantages over trucks of the type employing uprights for contributing vertical movement of a load platform or carriage. Among the advantages inherent in trucks employing leverage systems, in addition to the elimination of costly uprights, rollers, etc., are reduction of the minimum overall height, and positioning of the lifting mechanism on the truck to counterbalance the load.

In order to provide these added advantages, and still retain the maneuverability and lifting range of trucks of the class using conventional uprights, I have recognized that the leverage system, of necessity, must extend longitudinally of a substantial portion of the truck frame, and must be mounted at the upper rear portion of the truck. These essential characteristics of trucks of this class have led to several very considerable problems, since the truck must retain over-all dimensions small enough to permit efficient maneuvering in narrow warehouse aisles, while, at the same time, supporting a drive or traction unit as well as a power source and also providing a suitable operator's platform and control station, all so arranged as to afford maximum operator visibility and complete freedom of movement of the various parts of the leverage system throughout its entire cycle of operation. At the same time, all of these elements must be readily accessible for maintenance. It will be readily appreciated by those skilled in the art that because of its size, the disposition of the power source relatively to the remaining parts of the truck constitutes the major consideration in the solution of the foregoing problem.

I have conceived by my invention a novel construction that enables me to overcome all of the foregoing difficulties and disadvantages in a truck of the class employing a leverage system.

In essence, my invention resides in the utilization of a main frame having forward and rear wheels and a power source mounted between these forward and rear wheels with a part thereof below the level of a line extending between the axes of rotation of the forward and rear wheels while mounting the leverage system above the power source through mounting means extending vertically downwardly at each side of the power source.

As a feature of my invention, I employ a pair of spaced, vertical steel plates for supporting the levers. In the space between the plates, and at the lower, forward end of the main frame, I mount a drive or traction unit carrying the forward or traction wheeels. This arrangement provides space for a compartment just rearwardly of the traction unit and below the leverage system. It is in this compartment that I mount the power source. Either or both of the vertical steel plates may be provided with an access opening fitted with a removable closure to allow for maintenance or removal of the power source.

As another feature of my invention, the levers comprising the leverage system are mounted rearwardly of the truck and extend angularly downwardly in one position, to a position forward of the forward wheels where they engage and support a load platform.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

An illustrative embodiment has been chosen for purposes of illustration and description, and is shown in the accompanying drawings forming a part of the specification.

Figure 2:
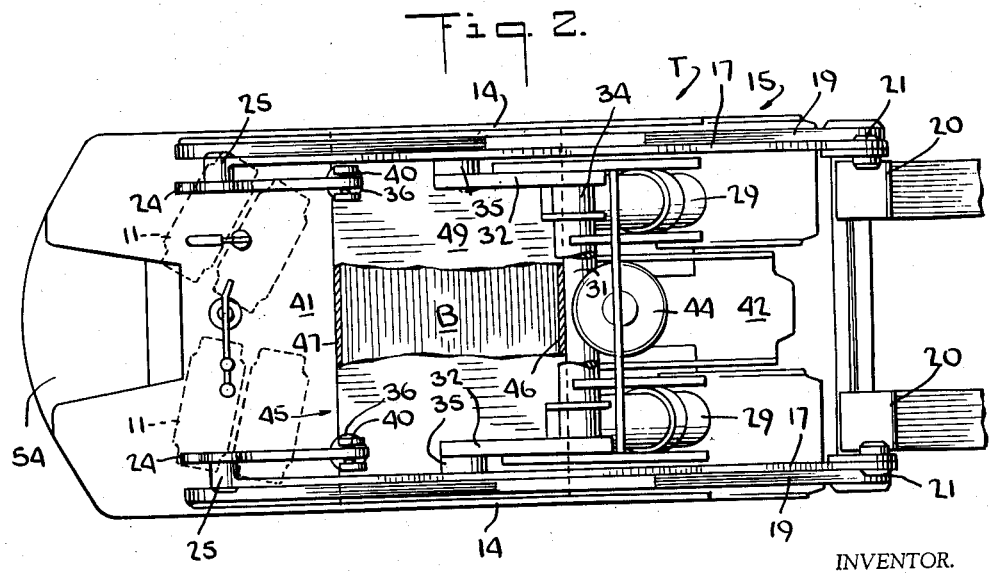

In the drawings:

Fig. 1 is a side elevational view, partly broken away, illustrating a truck manufactured in accordance with my present invention; and Fig. 2 is a top plan view, partly broken away, of the truck illustrated in Fig. 1.

Referring to the drawings, there is shown an electric powered industrial truck T having a main frame 10 supported by a pair of dual rear steering wheels 11 and a pair of front traction wheels 12.

The main frame 10 has a pair of spaced, vertical plates 14 disposed longitudinally at the side edges of the truck. These vertical plates serve to support a leverage system 15 that consists of an organization of levers and rams duplicated on each side of the truck and cooperating to control the lifting and lowering of a load carriage illustrated here as a fork 16.

Each of the organizations constituting the leverage system 15 comprises a pair of longitudinal levers 17 and 19 connected at their forward ends to a vertical arm 20 by pivots 21 and 22, and at their rear ends to a crank arm 24 by pivots 25 and 26. The relationships of the pivots 21 and 25 to pivots 22 and 26, respectively, is identical so that the portion of the system described thus far is a parallel motion mechanism, as will be well understood by those skilled in the art.

The crank arm 24 is supported by the pivot 26 at the upper end of an upwardly extending arm 27 which is in turn supported by a pivot 28 on an upper rear portion of the adjacent vertical plate 14.

Each of the duplicate organizations constituting the leverage system 15 has a hydraulic ram 29 pivotally supported as at 30 at the forward portion of one of the vertical plates 14. This ram extends upwardly and has a piston rod connected by a pivot 31 to an intermediate portion of a bell-crank 32. One end of the bell-crank is connected to the upper forward portion of the plate 14 by pivot 34, while the other end of the bell-crank is connected to an intermediate part of the lever 19 by a pivot 35.

A second ram 36 is supported by a pivot 37 on an upper rear portion of the plate 14 and has a piston rod 39 extending upwardly and pivoted at 40 to a forwardly extending portion of the crank arm 24 for a purpose to be later described.

As this point it is important to realize that in the lowered position of the fork 16, as illustrated, the levers 17 and 19 of the leverage system 15, are supported by the plates 14 and extend downwardly from the upper rear portions of the plates, angularly forwardly of the traction wheels 12 in close relation to the plates. By reason of this arrangement, a large space 41 is provided between the plates 14 in the transverse direction, and between the wheels 11 and 12 in the longitudinal direction.

In the forward end of this space 41, and partially disposed between the front wheels, is a traction unit 42 including a motor 44. Just rearwardly of the motor 44 a compartment 45 is formed by vertical transverse bulkheads or partitions 46, 47 and a horizontal partition 49, each of which extends between the vertical plates 14. As will be seen in Fig. 1, the compartment 45 is positioned beneath the leverage system 15, but with the arm 27 and ram 29 extending downwardly from parts of the system and positioned rearwardly and forwardly of the compartment 45. The leverage system 15 then will allow access to the compartment 45, while supported through the pivots 28, 30 that may be placed at points below the top of the compartment. I then form an access opening 50 for the compartment in at least one of the vertical plates 14, with a removable closure 51 normally covering the opening.

For the purpose of illustration, I have chosen to show as my power source a battery B contained within the compartment 45, although it will readily be appreciated that any other source of power, such as a gas engine may be employed. For convenient installation and removal of the battery B, I provide a series of rollers 52, mounted on a floor plate 53 at the bottom of the compartment 45. It will be noted that when the battery is in operative positive on the rollers 52, its bottom surface is at a level below a horizontal line extending rearwardly from the axis of rotation of the traction wheels 12. By maintaining the battery in such a low relation to the wheels and leverage system, I provide for full operation of the leverage system and great truck stability.

The main frame 10 extends rearwardly beyond the rear steering wheels 11 so that an operator's platform and control station 54 may be provided midway between the sides of the truck allowing an operator to have full forward vision between the duplicate sets of levers comprising the leverage system 15 and over the battery compartment 45.

To effect lifting movement of the leverage system 15, the piston rods of the rams 29 are protracted causing the bell-cranks 32 to rotate clockwise, as viewed, about the pivots 34. That rotation of bell-cranks 32 will elevate the levers 17 and 19, and the fork 16, about the pivots 25 and 26, and will at first cause a bodily rearward movement of the levers and fork through rearward swinging of the arm 27 on its pivot 28, so that fork 16 will lift in substantially a straight line. Should the lifting the continued the straight line movement will be maintained through a forward swinging of arm 27 on its pivot 28. Conversely, retraction of the same piston rods lowers the fork 16 to the position shown. The fork 16 may be tilted forwardly or rearwardly at any level of elevation by retraction or protraction, respectively, of the piston rods 39 of the rams 36. These rams 36 also serve to hold the levers 17 and 19, and the fork 16 in any desired tilted position.

From the foregoing description it will be seen that I have contributed a novel industrial truck of the foregoing class in which maximum maneuverability and minimum over-all height have been combined with maximum operator visibility and complete freedom of movement of the various parts of the leverage system. While providing all of these advantages, I have so disposed the various parts of the truck as to enable them to be readily accessible for maintenance.

I believe that the construction and operation of my novel industrial truck construction will now be understood, and that the advantages of my invention will be fully appreciated by those persons skilled in the art.

I now claim:

1. In a truck of the class described, a pair of spaced side plates comprising opposed vertical sides of the truck frame, a traction unit mounted between said plates at the lower forward end of the frame and equipped with traction wheels for the truck, a battery compartment between lower parts of said spaced side plates just rearwardly of the traction unit, means to support a battery in said compartment with the bottom of the battery at a level below the axis of rotation of said traction wheels, a load lifting lever system extending from a rear portion of the truck and above said battery compartment to points forwardly of said traction wheels for lifting a load in front of said wheels, said lever system including as portions thereof an arm and an actuating ram extending downwardly and mounting said system at points below the top of the battery compartment on forward and rearward parts of the truck frame, and said battery compartment having an opening extending through one of said frame side plates between said downwardly extending arm and ram, so that the lever system will allow full access to said compartment while the battery together with the lever system contribute to counterbalancing of the load.

2. In a truck of the class described, a pair of spaced side plates comprising opposed vertical sides of the truck frame, a traction unit mounted between said plates at the lower forward end of the frame and equipped with traction wheels for the truck, a battery compartment between lower parts of said spaced side plates just rearwardly of the traction unit, means to support a battery in said compartment with the bottom of the battery at a level below the axis of rotation of said traction wheels, a load lifting system including levers extending from a rear portion of the truck and in position between said side plates above said battery compartment to points forwardly of said traction wheels for lifting a load in front of said wheels, said load lifting system also including portions extending downwardly and pivoted at points below the top of the battery compartment on forward and rearward parts of the side plates to support the system, and said battery compartment having an opening extending through one of said frame side plates between said downwardly extending portions of the lifting system, so as to allow full access to said compartment while the battery and the lifting system contribute to counterbalancing of the load.

References Cited in the file of this patent

UNITED STATES PATENTS

| | | |
|---|---|---|
| 1,209,962 | Heath | Dec. 26, 1916 |
| 1,497,489 | Cochran | June 10, 1924 |
| 2,348,899 | Guighard et al. | May 16, 1944 |
| 2,587,769 | Rowe | Mar. 4, 1952 |
| 2,598,685 | Greenlief | June 3, 1952 |
| 2,704,615 | Stokes et al. | Mar. 22, 1955 |